(12) United States Patent
Bitoh

(10) Patent No.: US 7,975,992 B2
(45) Date of Patent: Jul. 12, 2011

(54) HUMIDITY ADJUSTMENT APPARATUS, POWER GENERATION APPARATUS, ELECTRONIC EQUIPMENT AND METHOD OF MANUFACTURING HOLLOW FIBER MEMBRANE MODULE

(75) Inventor: Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1097 days.

(21) Appl. No.: 11/786,377

(22) Filed: Apr. 11, 2007

(65) Prior Publication Data
US 2007/0246847 A1    Oct. 25, 2007

(30) Foreign Application Priority Data

Apr. 20, 2006    (JP) .................................. 2006-116821

(51) Int. Cl.
*B01F 3/04* (2006.01)
(52) U.S. Cl. ....................................................... 261/104
(58) Field of Classification Search .................. 261/101, 261/102, 104, 107
See application file for complete search history.

(56) References Cited

U.S. PATENT DOCUMENTS

| | | | | |
|---|---|---|---|---|
| 4,268,279 A | * | 5/1981 | Shindo et al. ................. 95/46 |
| 4,293,419 A | * | 10/1981 | Sekino et al. ............ 210/321.88 |
| 4,508,548 A | * | 4/1985 | Manatt ................................. 96/8 |
| 4,707,267 A | * | 11/1987 | Johnson ......................... 210/650 |
| 5,015,269 A | * | 5/1991 | Garrett et al. ..................... 95/45 |
| 5,158,581 A | * | 10/1992 | Coplan ............................. 95/52 |
| 5,525,144 A | * | 6/1996 | Gollan ................................ 96/8 |
| 5,938,922 A | * | 8/1999 | Fulk et al. ................. 210/321.81 |
| 6,755,399 B2 | * | 6/2004 | Shimanuki et al. ........... 261/104 |
| 6,790,262 B2 | * | 9/2004 | Sengupta et al. .................. 96/6 |
| 2004/0226218 A1 | * | 11/2004 | Izawa et al. ................. 48/127.9 |

FOREIGN PATENT DOCUMENTS

| | | |
|---|---|---|
| JP | 2003-065566 A | 3/2003 |
| JP | 2003-115311 A | 4/2003 |
| JP | 2004-093072 A | 3/2004 |
| JP | 2004-363027 A | 12/2004 |

OTHER PUBLICATIONS

Japanese Office Action (and English translation thereof) dated Jul. 15, 2008, issued in a counterpart Japanese Application.

* cited by examiner

*Primary Examiner* — Scott Bushey
(74) *Attorney, Agent, or Firm* — Holtz, Holtz, Goodman & Chick, PC

(57) ABSTRACT

A fuel feeder includes a fuel reserve body reserving a fuel, a fuel feed section feeding the fuel in the fuel reserve body to electric equipment, and a control section controlling the fuel feed section, wherein the control section obtains equipment information from by the electric equipment and operates the fuel feed section to feed the fuel after the control section has performed authentication of the electric equipment.

5 Claims, 6 Drawing Sheets

HUMIDITY ADJUSTMENT APPARATUS, POWER GENERATION APPARATUS, ELECTRONIC EQUIPMENT AND METHOD OF MANUFACTURING HOLLOW FIBER MEMBRANE MODULE

BACKGROUND OF THE INVENTION

1. Field of the Invention

The present invention relates to a humidity adjustment apparatus, a power generation apparatus, electronic equipment and a method of manufacturing a hollow fiber membrane module, and more particularly to a humidity adjustment apparatus capable of adjusting the humidity of a gas to be supplied to a fuel cell, a power generation apparatus, electronic equipment and a method of manufacturing a hollow fiber membrane module.

2. Description of Related Art

In recent years, the research and the development with regard to the power sources that can realize high energy use efficiency have been energetically performed.

Above all, a fuel cell is the one reacting a fuel with the oxygen in the atmosphere electrochemically to convert chemical energy into electric energy, and is recognized as a promising and hopeful power generation apparatus.

Such a power generation apparatus is generally provided with a humidifier (humidity adjustment apparatus) as an apparatus for adjusting humidity in order to keep the electrical conductivity of hydrogen ions high.

There has been known the membrane type humidifier (e.g. Japanese Patent Application Publication Laid-open No. 2003-115311) which is separated into a humidified gas chamber and a humidifying gas chamber with a water vapor permeable film; which introduces reacting air to be supplied to the air electrode of a fuel cell into the humidified gas chamber; which introduces an offgas ejected from the air electrode into the humidifying gas chamber; which introduces cell cooling water ejected from the cooling section of the fuel cell into the humidifying gas chamber at the same time; which thereby touches the offgas and the water with the reacting air through the water vapor permeable film to humidify the reacting air; and which adjusts the humidity thereby.

However, although the membrane type humidifier mentioned above can perform the humidification even into an unloaded condition by introducing both of the cell cooling water and the offgas into the one humidifying gas chamber and by humidifying the humidified gas (reacting gas and reacting air) in the humidified gas chamber through the water vapor permeable film, on the other hand it is not considered to adjust humidity to a desired value, and it is difficult to control the humidifying quantity of the humidified gas by the above humidifier.

SUMMARY OF THE INVENTION

The present invention was made in view of the situation mentioned above, and it is an object of the present invention to provide a humidity adjustment apparatus capable of easily adjusting the humidity of a humidity-adjusted fluid to a desired value by one apparatus by adjusting the humidity of the supplied humidity-adjusted fluid in each of a plurality of humidity adjusting sections defined by sealing sections, a power generation apparatus provided with the humidity adjustment apparatus, and electronic equipment mounted with the power generation apparatus. And, it is another object of the present invention to provide a method of manufacturing a hollow fiber membrane module to be used for the humidity adjustment apparatus by a method capable of being easily adapted to the prior art.

In order to accomplish the above object, in accordance with a first aspect of the invention, a humidity adjustment apparatus comprises: a plurality of humidity adjusting sections each adjusting humidity of a humidity-adjusted fluid whose humidity is adjusted, wherein each of the plurality of humidity adjusting sections includes a plurality of hollow fiber membranes, and each of the hollow fiber membranes is at least partly defined by a sealing section, and wherein the humidity-adjusted fluid, which is a gas including water vapor, flows in an inside of the plurality of hollow fiber membranes, and a humidity adjustment fluid, which is any one of a gas having a partial water vapor pressure different from that of the humidity-adjusted fluid and a liquid including water, flows in an outside of the plurality of hollow fiber membranes, and the humidity of the humidity-adjusted fluid is adjusted by transferring water molecules between the humidity-adjusted fluid and the humidity adjustment fluid.

In accordance with a second aspect of the invention, a power generation apparatus comprises: the above humidity adjustment apparatus; a reforming apparatus to reform a fuel to produce a reformed gas and to supply the produced reformed gas to the humidity adjustment apparatus; and a fuel cell to generate-electricity using the reformed gas whose humidity is adjusted by the humidity adjustment apparatus.

In accordance with a third aspect of the invention, electronic equipment comprises the above power generation apparatus.

In accordance with a fourth aspect of the invention, a humidity adjustment apparatus comprises: a plurality of hollow fiber membranes; a housing equipped with the plurality of hollow fiber membranes in an inside thereof; and at least one sealing section provided at an central part in an axis direction of the plurality of hollow fiber membranes in the inside of the housing and in an outside of the plurality of hollow fiber membranes, wherein the at least one sealing section defines a plurality of humidity adjusting sections by sealing a space between each of the plurality of hollow fiber membranes, and a humidity-adjusted fluid, which is a gas including water vapor, and whose humidity is adjusted, flows in an inside of the plurality of hollow fiber membranes, and a humidity adjustment fluid, which is any one of a gas having a partial water vapor pressure different from that of the humidity-adjusted fluid and a liquid including water, flows in the inside of the housing and in an outside of the plurality of hollow fiber membranes, and the humidity of the humidity-adjusted fluid is adjusted by transferring water molecules between the humidity-adjusted fluid and the humidity adjustment fluid.

In accordance with a fifth aspect of the invention, a power generation apparatus comprises: the above humidity adjustment apparatus; a reforming apparatus to reform a fuel to produce a reformed gas, and to supply the produced reformed gas to the humidity adjustment apparatus; and a fuel cell to generate electricity using the reformed gas whose humidity is adjusted by the humidity adjustment apparatus.

In accordance with a sixth aspect of the invention, electronic equipment comprises the above power generation apparatus.

In accordance with a seventh aspect of the invention, a humidity adjustment apparatus comprises: a plurality of humidity adjusting sections including: a plurality of hollow fiber membranes; a housing equipped with the plurality of hollow fiber membranes in an inside thereof; two sealing sections provided at both end portions in an axis direction of the plurality of hollow fiber membranes in the inside of the housing and in an outside of the plurality of hollow fiber membranes, the sealing sections sealing a space between each of the plurality of hollow fiber membranes, wherein a humidity-adjusted fluid, which is a gas including water vapor, and whose humidity is adjusted, flows in an inside of the plurality of hollow fiber membranes, and a humidity adjustment fluid, which is any one of a gas having a partial water vapor pressure different from that of the humidity-adjusted fluid and a liquid including water, flows in the inside of the housing and in the outside of the plurality of hollow fiber membranes, and the humidity of the humidity-adjusted fluid is adjusted by transferring water molecules between the humidity-adjusted fluid and the humidity adjustment fluid.

In accordance with an eighth aspect of the invention, a power generation apparatus comprises: the above humidity adjustment apparatus; a reforming apparatus to reform a fuel to produce a reformed gas and to supply the produced reformed gas to the humidity adjustment apparatus; and a fuel cell to generate electricity using the reformed gas having humidity adjusted by the humidity adjustment apparatus.

In accordance with a ninth aspect of the invention, electronic equipment comprises the above power generation apparatus.

In accordance with a tenth aspect of the invention, a humidity adjustment apparatus comprises: a plurality of humidity adjusting sections including: a plurality of hollow fiber membranes; a housing equipped with the plurality of hollow fiber membranes in an inside thereof, the housing equipped with a partition having one end portion thereof connected to the housing and another end portion thereof separated from the housing; and two sealing sections provided at both end portions in an axis direction of the plurality of hollow fiber membranes in the inside of the housing and in an outside of the plurality of hollow fiber membranes, the sealing sections sealing spaces between each of the plurality of hollow fiber membranes, wherein a humidity-adjusted fluid, which is a gas including water vapor, and whose humidity is adjusted, flows in an inside of the plurality of hollow fiber membranes, and a humidity adjustment fluid, which is any one of a gas having a partial water vapor pressure different from that of the humidity-adjusted fluid and a liquid including water, flows in the inside of the housing and in the outside of the plurality of hollow fiber membranes, and the humidity of the humidity-adjusted fluid is adjusted by transferring water molecules between the humidity-adjusted fluid and the humidity adjustment fluid.

In accordance with a eleventh aspect of the invention, a power generation apparatus comprises: the above humidity adjustment apparatus; a reforming apparatus to reform a fuel to produce a reformed gas and to supply the produced reformed gas to the humidity adjustment apparatus; and a fuel cell to generate electricity using the reformed gas having humidity adjusted by the humidity adjustment apparatus.

In accordance with a twelfth aspect of the invention, electronic equipment comprises the above power generation apparatus.

In accordance with a thirteenth aspect of the invention, a method of manufacturing a hollow fiber membrane module, comprises of: bundling a plurality of hollow fiber membranes; and injecting a sealing medium sealing a space between each of the plurality of hollow fiber membranes into a space between each of the bundled plurality of hollow fiber membranes at an central part in an axis direction thereof.

BRIEF DESCRIPTION OF THE DRAWINGS

The aforesaid and further objects, features and advantages of the present invention will become more apparent from the following detailed description when read in conjunction with the accompanying drawings, in which.

DETAILED DESCRIPTION OF THE PREFERRED EMBODIMENTS

In the following, the preferred embodiments of the present invention will be described with reference to the attached drawings. However, the scope of the present invention is not limited to the shown examples.

First Embodiment

A humidification device (humidity adjustment apparatus) of the present embodiment adjusts the humidity of, for example, a reformed gas (humidity-adjusted fluid) including hydrogen to be supplied to a fuel cell by humidifying the reformed gas, and is comprised in a power generation apparatus, which will be described later. First, the configuration of the humidification device will be described.

Figures 1A, 1B:
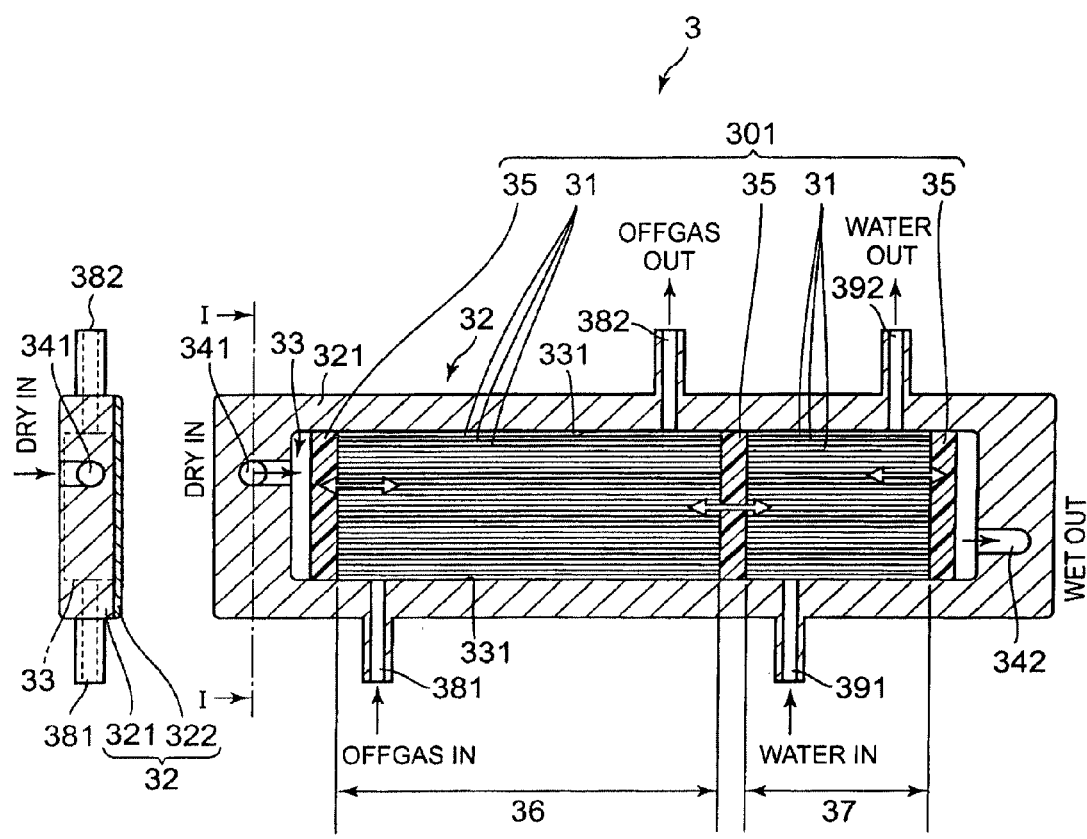
FIG. 1A is a planar sectional view of a humidification device for illustrating a first embodiment of the present invention.
FIG. 1B is a sectional view of the humidification device along a cutting plane line I-I as viewed from the direction of arrows.

FIG. 1A is a planar sectional view of a humidification device 3, and FIG. 1B is a sectional view of the humidification device 3 along a cutting plane line I-I as viewed from the direction of arrows.

The humidification device 3 comprises a hollow fiber membrane module 301 and a case 32 housing the hollow fiber membrane module 301 therein. The hollow fiber membrane module 301 comprises a bundled plurality of hollow fiber membranes 31 each having a hollow at the central portion thereof and formed to be almost a cylindrical configuration. The hollow fiber membrane module 301 humidifies the reformed gas supplied on the inside of the hollow fiber membranes 31 by transferring water molecules between the inside and the outside of each of the bundled plurality of hollow fiber membranes 31.

The case 32 comprises a case body 321 and a cover 322 covering the case body 321. The case body 321 extends in the direction parallel to the axes of the hollow fiber membranes formed in the cylindrical configuration mentioned above (hereinafter referred to as a longitudinal direction) and has a concave portion on the top surface thereof. By covering the concave portion of the case body 321 with the cover 322, a long rectangular hollow 33 is formed in the inner part of the case 32. As the materials of the case body 321 and the cover 322, for example, metals such as stainless steel and aluminum in consideration of their strength and their corrosion resistance.

A reformed gas supply tube 341 is provided on the under surface at the left end part of the case body 321. The reformed gas supply tube 341 penetrates the under surface to communicate with the inside of the hollow 33 for supplying the reformed gas generated by a selective oxidation reactor 23 of a reforming apparatus 2, which will be described later (see FIG. 3). A reformed gas ejection tube 342 is provided on the top surface at the right end part of the cover 322. The reformed gas ejection tube 342 penetrates the top surface to communicate with the inside of the hollow 33 for supplying the hydrogen in a humidified reformed gas into a fuel cell 4 (see FIG. 3). The reformed gas is sent form the reformed gas supply tube 341 on the upstream side to the reformed gas ejection tube 342 on the downstream side by the pressure generated by a feed pump (not shown) for supplying a fuel from a fuel cartridge 1 to a vaporizer 21, both described later.

One hollow fiber membrane module 301 comprising the bundled plurality of hollow fiber membranes 31 is housed in the hollow 33 formed in this way.

Each of the hollow fiber membranes 31 is a polymer membrane of a polyimide series or a fluorine series, and has the hollow at the central portion thereof. As such a hollow fiber membrane, for example, polyphenylsulfone, polyetherimide, both being micro porous materials made by NOK corporation, and the non-porous material made of tetrafluoroethylene and perfluorovinylether and the like, which can be available from Ashahi Glass Co., Ltd., can be used. Moreover, a hollow fiber membrane made of polyethylene, polyvinylidene-fluoride (PVDF), polyether sulfone, polyacrylonitrile, cellulose acetate or the like may be used.

The exchange of the water molecules is performed through the hollow fiber membranes 31 so that the difference of partial water vapor pressure between the inside and the outside of the hollow fiber membranes 31 may be reduced by introducing a reformed gas having low humidity into the inner part of the hollow fiber membranes 31, and by circulating the offgas (a first humidity adjustment fluid) ejected from the fuel cell 4 and having high humidity or the water (a second humidity adjustment fluid) supplied from the fuel cartridge 1, which will be described later, on the outside of the hollow fiber membranes 31. In the embodiment mentioned above, the humidity is adjusted by the transference of water molecules from the outside of the hollow fiber membranes 31 to the inside thereof to humidify the reformed gas. Here, the offgas is a gas including the water generated at the air electrode of the fuel cell 4, unreacted oxygen and the like, and is the gas having the humidity higher than that of the above reformed gas.

A plurality of such hollow fiber membranes 31 is bundled, and each of the sealing sections 35 seals the parts between the peripheral surface of each of the hollow fiber membranes 31 and the inner wall surface 331 forming the hollow 33 at the both end portions in the longitudinal direction and the position on the right side of the central part in the longitudinal direction of the hollow fiber membranes 31. By these sealing sections 35, the hollow 33 is partitioned into a offgas humidification section 36 (one humidity adjusting section) supplying the offgas from an offgas supply tube 381, which will be described later, to the hollow 33 to humidify the offgas, and a water humidification section 37 (one of the other humidity adjusting section) supplying water from a water supply tube 391, which will be described later, to the hollow 33 to humidify the hollow 33. That is, the hollow enclosed by the sealing section 35 at the left end part, the sealing section 35 at almost the central part, and the inner wall surface 331 of the hollow 33 is made to be the offgas humidification section 36, and the hollow enclosed by the sealing section 35 at the right end part, the sealing section 35 at almost the central part, and the inner wall surface 331 of the hollow 33 is made to be the water humidification section 37. Because the sealing section 35 at almost the central part is located at the position on the right side of the central part in the longitudinal direction, the offgas humidification section 36 has a length longer than that of the water humidification section 37 in the longitudinal direction, and the region in which the reformed gas is humidified by the offgas is larger than the region in which the reformed gas is humidified by the water.

Moreover, because the space between sealing section 35 at the left end part and the inner wall surface 331 forming the left end part of the hollow 33 communicates with the hollow of the hollow fiber membranes 31, the humidification device 3 is configured so that only the reformed gas can flow. Similarly, because the space between the sealing section 35 at the right end part and the inner wall surface 331 forming the right end part of the hollow 33 communicates with the hollow of the hollow fiber membranes 31, the humidification device 3 is configured so that only the reformed gas can flow.

The offgas humidification section 36 is provided with the offgas supply tube 381 supplying the offgas into the offgas humidification section 36, and an offgas ejection tube 382 ejecting offgas from the offgas humidification section 36.

The offgas supply tube 381 is provided so that one end thereof may penetrate the case body 321 from the front thereof (the under side of the humidification device 3 in FIG. 1) to the inside of the offgas humidification section 36, and so that the other end of the offgas supply tube 381 is connected to the fuel cell 4, which will be described later, to which the offgas is ejected. The offgas is sent from the offgas supply tube 381 on the upstream side to the offgas ejection tube 382 on the downstream side by the pressure generated by another feed pump (not shown) for supplying the fuel from the fuel cartridge 1 to the vaporizer 21 similarly to the above reformed gas.

The offgas ejection tube 382 is provided so that one end thereof may penetrate the case body 321 into the offgas humidification section 36 at a position on the right side of the offgas supply tube 381 on the back surface (the upper side of the humidification device 3 in FIG. 1) of the case body 321, and so that the other end of the offgas ejection tube 382 may be connected to a not shown offgas combustor.

The water humidification section 37 is provided with the water supply tube 391 supplying water into the water humidification section 37, and a water ejection tube 392 ejecting water from the water humidification section 37.

The water supply tube 391 is provided so that one end thereof may penetrate the case body 321 into the water humidification section 37 at the position on the right side of the offgas supply tube 381 on the front of the case body 321, and so that the other end of the water supply tube 391 may be connected to the fuel cartridge 1, which will be described later, for supplying water. The water is sent from the water supply tube 391 on the upstream side to the water ejection tube 392 on the downstream side by the pressure generated by a feed pump (not shown) for sending the water from the fuel cartridge 1, which will be described later, to the humidification device 3.

The water ejection tube 392 is provided so that one end thereof may penetrate the case body 321 into the water humidification section 37 at a position on the right side of the water supply tube 391 on the back surface of the case body 321, and so that the other end of the water ejection tube 392 may be connected to a not shown water recovery section or may communicate with the outside of the equipment provided with the present humidification device 3, namely the atmosphere.

Consequently, the offgas supplied from the offgas supply tube 381 to the offgas humidification section 36 is sent to the offgas ejection tube 382, and at this time the water molecules included in the offgas move to the inside of the above hollow fiber membranes 31 and the reformed gas is humidified. After that, the offgas is ejected from the offgas ejection tube 382.

Moreover, the water supplied from the water supply tube 391 to the water humidification section 37 is also sent to the water ejection tube 392. At this time, the water molecules included in the water transfer into the inside of the above hollow fiber membranes 31, and the reformed gas is humidified. After that, the water is ejected from the water ejection tube 392.

Here, a method of manufacturing the hollow fiber membrane module 301 is described with reference to FIG. 2.

FIGS. 2A-H are process charts showing the method of manufacturing the hollow fiber membrane module 301.

Figure 2A:
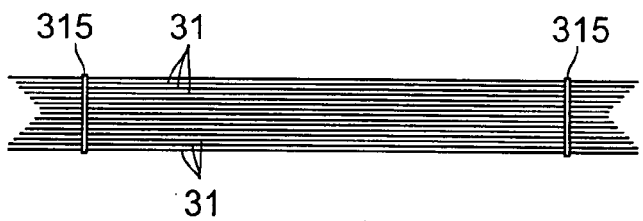
FIGS. 2A-2H are process charts showing a method of manufacturing a hollow fiber membrane module.

As shown in FIG. 2A, first, a plurality of hollow fiber membranes 31 is bundled into the shape of a cylinder with temporary joints 315 made of an elastic body such as rubber. At this time, the plurality of hollow fiber membranes 31 to be bundled having mutually different lengths is used, and is arranged so that the lengths of the hollow fiber membranes 31 may become gradually longer from the inside of the cylinder to the outside thereof.

Figure 2B:
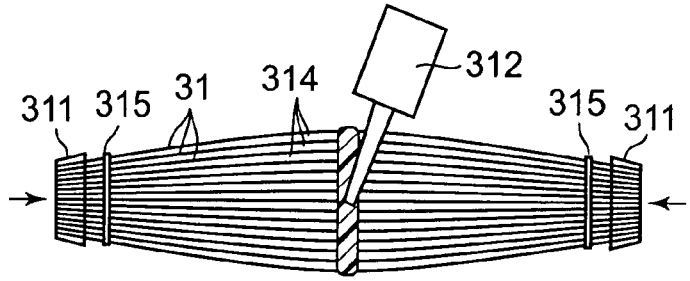

Next, as shown in FIG. 2B, tectiform cups 311 having the same size as those of the cross sections of both the end portions of each of the bundled plurality of hollow fiber membranes 31 are pushed against both the end portions, and gaps 314 are formed among each of the hollow fiber membranes 31. Then, a sealing medium 312 is injected into each of the gaps 314 at the central position in the longitudinal direction of the hollow fiber membranes 31. Here, it is for spreading the sealing medium 312 between each of the plurality of densely arranged hollow fiber membranes 31 to form the gaps 314.

Moreover, because the hollow fiber membranes 31 disposed on the outside of the cylinder is longer than those disposed on the inside, the gaps 314 among each of the hollow fiber membranes 31 are made to be almost uniform when the hollow fiber membranes 31 are pushed against to each other by the cups 311, and the hollow fiber membranes 31 are resulted in being securely fixed by the sealing medium 312. As the sealing medium 312, for example, a thermoset resin, a naturally hardenable resin, a light-setting resin and the like can be cited.

Figure 2C:
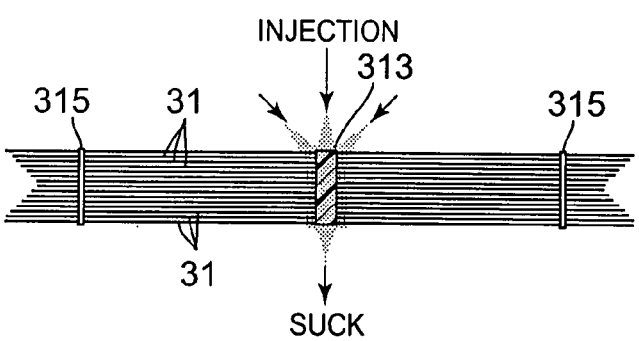

Next, as shown in FIG. 2C, the cups 311 are taken off, and the hollow fiber membranes 31 are restored to the original shapes. The temporary joints 315 are being disposed at the positions near the left and the right end parts as they are lest the bundle of the hollow fiber membranes 31 should be scattered.

A mold 313 is fit at the central position, where the sealing medium 312 has been injected, and the sealing medium 312 is further injected. At the same time, the air is made to be out and a surplus sealing medium is sucked out. The reason of making the air out is to exclude air layers and air bubbles that can be produced at the time of the injection of the sealing medium 312, and to fill up the sealing medium 312 more densely and securely.

Furthermore, the mold 313 is removed after the curing of the sealing medium 312 by a desired method, and the sealing section 35 is formed by taking away burrs or shaving the sealing medium 312.

Figure 2D:
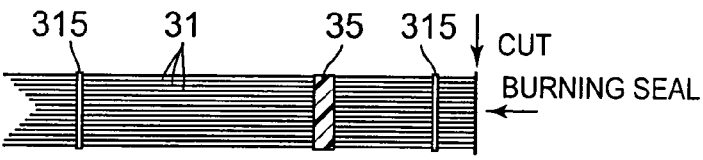

On the other hand, as shown in FIG. 2D, the temporary joint 315 on the right side is moved to the inside, and the hollow fiber membranes 31 are cut to have a desired length. Then, the end portions of the hollow fiber membranes 31 are cut to an even length. Because the position of the sealing section 35 is determined by the cutting, the length of the offgas humidification section 36 and the length of the water humidification section 37 can be easily controlled.

Next, the end faces of the hollow fiber membranes 31 are burned so that their holes are obstructed lest the sealing medium 312 should enter the inside of the hollow fiber membranes 31 at a sealing medium formation process, which will be described later, to the end portion.

Figure 2E:
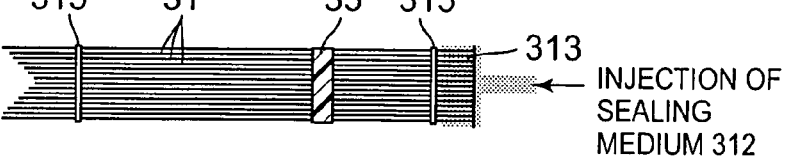
Figure 2F:
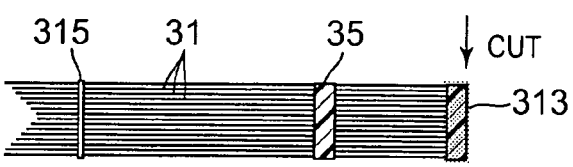
Figure 2G:

After that, as shown in FIG. 2E, the mold 313 is fitted to the end face, and the sealing medium 312 is injected. Then, the hollow fiber membranes 31 are subjected to centrifugation. This operation is performed for excluding the air layer of the sealing medium 312 at the end portion and for spreading the sealing medium 312 among each of the hollow fiber membranes 31 by performing the centrifugation. Then, the sealing medium 312 is furthermore cured by a desired method. Incidentally, if the sealing medium 312 can be densely formed, the centrifugation and the heat curing may be performed at the same time.

Then, the part where the sealing medium 312 was injected is cut together with the mold 313 (see FIG. 2F) to remove the mold 313. After that, burrs are taken away and the hollow fiber membranes 31 are shaved to form the sealing section 35 (see FIG. 2G) similarly to the above sealing section 35 formed at the central position.

Figure 2H:
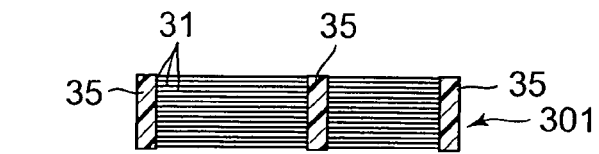

Moreover, a sealing section 35 is also formed at the left end part of the hollow fiber membranes 31 by the method similarly to that at the right end part, and the hollow fiber membrane module 301 is manufactured in this way (see FIG. 2H). The manufactured hollow fiber membrane module 301 is inserted into the concave portion of the case body 321 after an adhesive and sealing medium has been applied to the sealing section 35 formed at the position on the right side of the central part of the hollow fiber membranes 31 and the sealing sections 35 formed at both the end portions. Then, the cover 322 is fastened with the case body 321 by an adhesive, or an O-ring or the like and a screw. Incidentally, the gaps between the inner wall surfaces of the case body 321 and the cover 322 and each of the sealing sections 35 are hermetically sealed by the above adhesive and sealing medium, and the gap between the humidification device 3 and the outside thereof is hermetically sealed with the above adhesive or the O-ring and the like.

The principle of controlling the humidity of a reformed gas by the humidification device 3 formed as mentioned above is as follows.

If a reformed gas whose humidity is adjusted to a predetermined value flow in the insides of the hollow fiber membranes 31 and only an offgas having humidity higher than that of the reformed gas flows on the outside of the hollow fiber membranes 31, then the reformed gas can be humidified to several tens percents (first humidity) at the maximum. On the other hand, if only water flows on the outside of the hollow fiber membranes 31, the reformed gas can be humidified to 100 percents (second humidity) at the maximum. Here, the longer the length of the offgas humidification section 36 or the water humidification section 37 in the longitudinal direction is, the higher the humidity of the reformed gas becomes.

On the other hand, if the length in the above longitudinal direction is a predetermined value, for example, about several centimeters each, then the reformed gas can be humidified up to the above maximum humidity.

Accordingly, by forming the length of the offgas humidification section 36 in the longitudinal direction of the hollow fiber membranes 31 to be the predetermined value or more, the reformed gas is humidified up to the above first humidity in the first offgas humidification section 36. Accordingly, it is possible to manufacture the humidification device 3 capable of making the humidity of the reformed gas the desired humidity of from the above first humidity to the second humidity (100 percents) by suitably changing the positions where the sealing sections 35 are formed so that the length of the water humidification section 37 may be a value smaller than the predetermined value to the above predetermined value in each process of forming the above sealing sections 35. Because the humidity of the reformed gas can be changed by the positions where the sealing sections 35 are formed in this manner, the control of the humidity of the reformed gas becomes easy.

Next, the operation of the humidification device 3 having the above configuration is described.

The reformed gas supplied from the selective oxidation reactor 23, which will be described later, to the offgas humidification section 36 in the hollow 33 of the case 32 through the reformed gas supply tube 341 is supplied into the hollow of each of the hollow fiber membranes 31 from the left end part of the hollow fiber membrane module 301. On the other hand, the offgas is supplied from the offgas supply tube 381 to the offgas humidification section 36, and the water molecules in the offgas is taken in from the outside of the hollow fiber membranes 31 to their inner parts and the reformed gas in the hollow of the hollow fiber membranes 31 is humidified by the offgas. The humidified reformed gas flows in the hollow of the hollow fiber membranes 31 as it is. Moreover, the offgas supplied from the offgas supply tube 381 is ejected to the offgas ejection tube 382 by the pressure difference in the case 32.

Furthermore, water is supplied from the water supply tube 391 to the water humidification section 37, and water molecules is taken in from the outside of the hollow fiber membranes 31 to their inner part by the water and the water molecules transfers in the hollow fiber membranes 31. Then, the reformed gas humidified by the offgas is furthermore humidified. The humidified reformed gas is ejected from the right end part of the hollow fiber membranes 31 to the outside of the case 32 through the reformed gas ejection tube 342. After that, the reformed gas is supplied to the fuel cell 4. Moreover, the water supplied from the water supply tube 391 is ejected to the water ejection tube 392 by the pressure difference in the case 32.

Next, a power generation apparatus 100 provided with the above humidification device 3 and portable electronic equipment 101 mounted with the power generation apparatus 100 are described.

Figure 3:
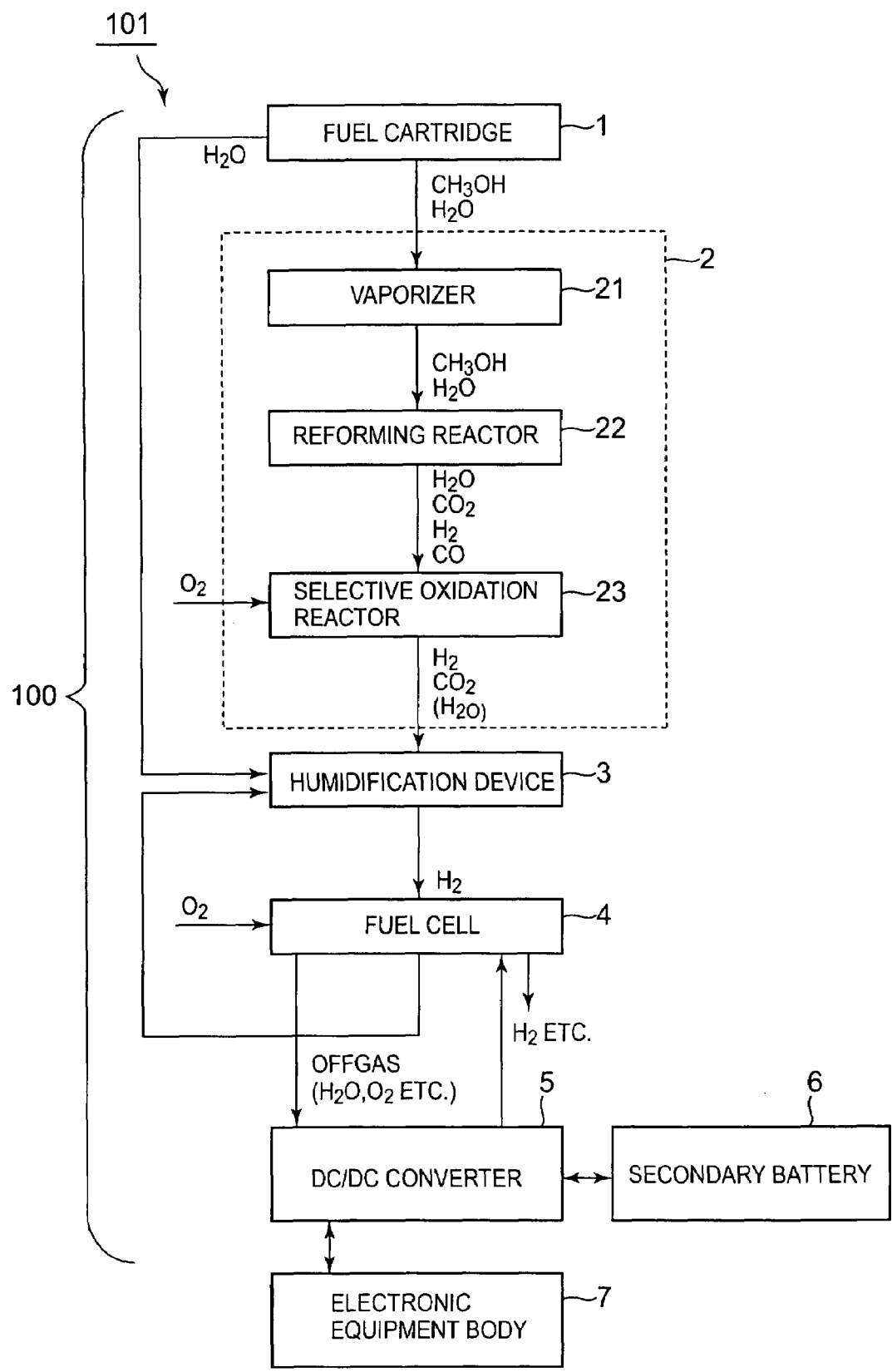
FIG. 3 is a block diagram showing portable electronic equipment mounted with a power generation apparatus provided with the humidification device cartridge of the first embodiment of the present invention.

FIG. 3 is a block diagram showing the power generation apparatus 100 provided with the humidification device 3 according to a first embodiment of the present invention and the portable electronic equipment 101 mounted with the power generation apparatus 100. The electronic equipment 101 is portable type electronic equipment such as a notebook-size personal computer, a personal digital assistant (PbA), an electronic databook, a digital camera, a portable telephone, a wrist watch, a register and a projector, and the like.

The power generation apparatus 100 is provided with the reforming apparatus 2 reforming the fuel supplied from the fuel cartridge 1, in which fuel for power generation and the like are encapsulated, to generate the reformed gas including at least hydrogen and carbon dioxide, the humidification device 3 humidifying a reformed gas by supplying the reformed gas from the reforming apparatus 2 into an aftermentioned water tank 31, a fuel cell 4 generating electricity using humidified hydrogen, a DC/DC converter 5 converting the electric energy generated by the fuel cell apparatus 4 into an appropriate voltage, a secondary battery 6 connected to the DC/DC converter 5, and an electronic equipment body 7 to which electric energy is supplied from the DC/DC converter 5.

The fuel cell apparatus 4 generates electric energy to output the generated electric energy to the DC/DC converter 5. The DC/DC converter 5 is configured to be able to perform the function of charging the electric energy generated by the fuel cell apparatus 4 in the secondary battery 6 to supply the electricity accumulated in the secondary battery 6 to the electronic equipment body 7 when the fuel cell apparatus 4 is not operating in addition to the function of converting the electric energy generated by the fuel cell apparatus 4 into an appropriate voltage to supply the converted voltage to the electronic equipment body 7 after the conversion.

The fuel for power generation encapsulated in the fuel cartridge 1 is planned to use a liquid mixture of methanol and water, but the fuel is not limited to the liquid mixture. Alcoholic liquid fuels such as ethanol and butanol, and liquid fuels made of carbon hydride such as dimethyl ether, isobutane and a natural gas, which are a gas at an ordinary temperature under an ordinary pressure, can be applied in place of the methanol.

Moreover, also water for supplying the water to the humidification device 3 is encapsulated in the fuel cartridge 1, and the fuel cartridge 1 is connected to the water supply tube 391 of the humidification device 3.

The reforming apparatus 2 comprises the vaporizer 21, a water vapor reforming reactor 22 and the selective oxidation reactor 23. Each of the vaporizer 21, the water vapor reforming reactor 22 and the selective oxidation reactor 23 function as a micro-reactor flowing a liquid in a groove formed on a small-sized substrate made of silicon, aluminum alloy, glass or the like to vaporize or to cause a chemical reaction in at least a part of the liquid by heating the liquid.

The fuel stored in the fuel cartridge 1 is supplied to the vaporizer 21 first. In the vaporizer 21, the supplied fuel is heated to be vaporized (evaporated), and is reformed to be the gas of methanol and water (water vapor) to be supplied to the water vapor reforming reactor 22.

In the water vapor reforming reactor 22, hydrogen and carbon dioxide are produced from the fuel vaporized in the vaporizer 21. To put it concretely, as chemical reaction formula (1), the methanol and the water vapor that have been made to a reformed gas by the vaporizer 21 react with each other, and carbon dioxide and hydrogen are produced.

$$CH_3OH + H_2O \rightarrow 3H_2 + CO_2 \quad (1)$$

In the water vapor reforming reactor 22, the methanol and the water vapor that have been reformed to the reformed gas in the vaporizer 21 are not completely reformed to the carbon dioxide and the hydrogen sometimes. In this case, the methanol and the water vapor that have reformed as the reformed gas react with each other to produce carbon dioxide, carbon monoxide and hydrogen are produced as shown in chemical reaction formula (2).

$$2CH_3OH + H_2O \rightarrow 5H_2 + CO + CO_2 \quad (2)$$

The water vapor, the carbon monoxide, the carbon dioxide and the hydrogen that have been produced in the water vapor reforming reactor 22 are supplied to the selective oxidation reactor 23.

In the selective oxidation reactor 23, the carbon monoxide included in the reformed gas supplied from the water vapor reforming reactor 22 is selectively oxidized, and the carbon monoxide is removed from the reformed gas. To put it concretely, the carbon monoxide in the reformed gas supplied from the water vapor reforming reactor 22 and the oxygen in the outside air sent into the selective oxidation reactor 23 react with each other, and then carbon dioxide is produced.

$$2CO + O_2 \rightarrow 2CO_2 \quad (3)$$

Then, in the present embodiment, the produced reformed gas is supplied from the selective oxidation reactor 23 into the case 32 of the humidification device 3, and thereby the reformed gas is humidified in the humidification device 3.

In this manner, the fuel is subjected to the chemical reaction in each reactor of the vaporizer 21, the water vapor reforming reactor 22 and the selective oxidation reactor 23 of the reforming apparatus 2, and the reformed gas is produced. The produced reformed gas passes through the humidification device 3, and thereby the humidified reformed gas is produced. The humidified reformed gas is supplied to the fuel cell 4.

The fuel cell 4 is configured to include a fuel electrode, a solid polymer electrolyte membrane, air electrode (all are not shown). As shown in an electrochemical reaction formula (4), the fuel electrode of the fuel cell 4 separates the hydrogen gas in the reformed gas supplied from the selective oxidation reactor 23 through the humidification device 3 to hydrogen ions and electrons by the operation of the catalyst fine particles of the fuel electrode, and furthermore the separated electrons are taken out.

$$3H_2 \rightarrow 6H^+ + 6e^- \quad (4)$$

Moreover, the solid polymer electrolyte membrane transmits the separated hydrogen ions therethrough to conduct the hydrogen ions to the air electrode.

The air taken from the outside is supplied to the air electrode of the fuel cell 4, and the oxygen in the air, the hydrogen ions that have transmitted an ion-conductive membrane and the electrons taken out by the fuel electrode react with one another to produce water as a by-product as shown in an electrochemical reaction formula (5).

$$6H^+ + 3/2 O_2 + 6e^- \rightarrow 3H_2O \quad (5)$$

As described above, in the fuel cell 4, the electrochemical reactions of the above electrochemical reaction formulae (4) and (5) are caused, and thereby electric energy is generated.

As above, according to the first embodiment of the present invention, in the humidification device 3, because the sealing sections 35 sealing the spaces between the peripheral surface of each of the hollow fiber membranes 31 and the inner wall surface 331 of the case 32 are severally provided at almost the central part and both the end portions in the longitudinal direction of the one hollow fiber membrane module 301 housed in the hollow 33 of the case 32, the hollow 33 is thereby partitioned to the offgas humidification section 36 and the water humidification section 37. Consequently, the offgas supplied to the offgas humidification section 36 and the water supplied to the water humidification section 37 are not mixed with each other. First, the reformed gas supplied into the hollow fiber membranes 31 is humidified by the offgas in the offgas humidification section 36, and after that the reformed gas is humidified by the water in the water humidification section 37. In this manner, the humidification by both of the offgas and the water can be easily realized in the one humidification device 3, and desired humidity can be obtained (in the range of from several tens percents to one hundred percents). As a result, the hydrogen in the humidified reformed gas can be used as the fuel of the fuel cell 4.

Moreover, the provision of the sealing sections 35 at almost the central part and both the end portions in the longitudinal direction of the hollow fiber membrane module 301 enables the partition of the hollow 33 to the offgas humidification section 36 and the water humidification section 37 easily in the state of high airtightness, and makes it needless to provide individual apparatus of a humidification device for offgas and a humidification device for water. Then, because the hollow fiber membrane module 301 of the present invention is the hollow fiber membrane module 301 having almost the same shape as that of the prior art except for provision of sealing sections 35, the capacity of the case 32 housing the hollow fiber membrane module 301 is hardly changed and the hollow fiber membrane module 301 can be easily adapted to the prior art and can reduce the introducing cost and the developing cost.

Moreover, by suitably changing the positions of the sealing section 35 at almost the central part in the longitudinal direction of the hollow fiber membrane module 301 and the length of the hollow fiber membrane module 301 itself, the sizes of the offgas humidification section 36 and the water humidification section 37 can be changed, and consequently the control of humidity becomes easy.

Moreover, because the sealing sections 35 are provided at both the end portions of the hollow fiber membrane module 301, the reformed gas supplied from the end portion of the hollow fiber membrane module 301 into the hollow in the hollow fiber membranes 31, and the offgas in the offgas humidification section 36 or the water in the water humidification section 37 are not mutually mixed.

Furthermore, because the sealing sections 35 can be provided in the procedure of forming the gaps 314 among the plurality of hollow fiber membranes 31 and injecting the sealing medium 312 into the gaps 314 at almost the central part in the longitudinal direction, and then simultaneously performing the injection of the fitting sealing medium 312 into the mold 313 and the ejection of air, the manufacturing of the hollow fiber membrane module 301 is easy.

Moreover, as described above, the reformed gas is first humidified in the offgas humidification section 36, and is secondly humidified in the water humidification section 37. By humidifying the reformed gas with offgas first, the humidity of the offgas can be greatly reduced in comparison with the case of humidifying the reformed gas with water first. Because the reformed gas is humidified by the water in advance in the case of performing the humidification by the water, the quantity of the reformed gas to be humidified in the offgas humidification section decreases, and the decreased quantity of the humidity of the offgas in the offgas humidification section falls. When the offgas is ejected from the offgas humidification section, the offgas is sent to the offgas combustor to be burned there, and the water molecules separated from the offgas is ejected to the outside of the power generation system. Accordingly, the quantity of the offgas to be ejected is desirably set to be little as much as possible. The humidity of the offgas can fall relatively greatly in the offgas humidification section by performing the humidification in the order of the above embodiment.

Second Embodiment

Figures 4A, 4B:
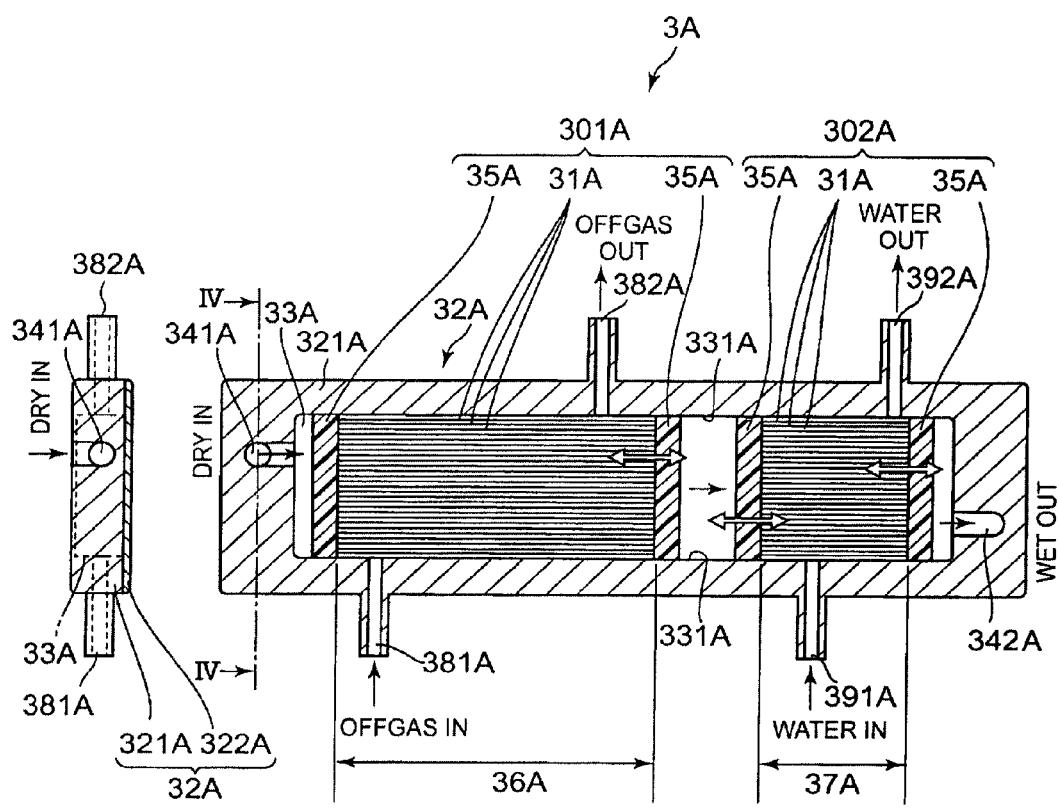
FIG. 4A is a planar sectional view of a humidification device for illustrating a second embodiment of the present invention.
FIG. 4B is a sectional view of the humidification device along a cutting plane line IV-IV as viewed from the direction of arrows.

FIG. 4A is a planar sectional view of the humidification device 3, and FIG. 4B is a sectional view as viewed from the direction of arrows at the time of cutting the humidification device 3 along a cutting plane line IV-IV.

Incidentally, the second embodiment differs from the first embodiment mentioned above in that two hollow fiber membrane modules 301A and 302A are housed along the longitudinal direction in a case 32A in the humidification device 3A, and has the other reforming apparatus 2 and the fuel cell 4 constituting the power generation apparatus 100 and having the configurations similar to those of the first embodiment. Accordingly the descriptions of the components having the similar configurations are omitted. Incidentally, the components corresponding to those of the above first embodiment are denoted by reference numerals with a letter "A" at the end of the numerals.

The humidification device 3A comprises two hollow fiber membrane modules 301A and 302A and a case 32A housing the hollow fiber membrane modules 301A and 302A therein. The case 32A comprises a case body 321A and a cover 322A similarly to the first embodiment. A reformed gas supply tube 341A and a reformed gas ejection tube 342A are connected to the case 32A.

The two hollow fiber membrane modules 301A and 302A are housed with a predetermined space between them in the longitudinal direction in the hollow 33A of the case 32A, and sealing sections 35A are provided at both the end portions of each of the hollow fiber membrane modules 301A and 302A. Consequently, the hollow enclosed by the sealing sections 35A provided at both the end portions of the hollow fiber membrane module 301A on the left side and the inner wall surface 331A of the hollow 33A is used as the offgas humidification section 36A (one humidity adjusting section), and the hollow enclosed by the sealing sections 35A provided at both the end portions of the hollow fiber membrane module 302A on the right side and the inner wall surface 331A of the hollow 33A is used as the water humidification section 37A (one of the other humidity adjusting section).

Moreover, the length in the longitudinal direction of the offgas humidification section 36A is longer than that of the water humidification section 37A, and the region in which the reformed gas is humidified by the offgas is made to be larger than the region in which the reformed gas is humidified by the water.

Furthermore, because the space between the sealing section 35A at the right end part of the hollow fiber membrane module 301A on the left side and the sealing section 35A at the left end part of the hollow fiber membrane module 302A on the right side communicates with the hollow of the hollow fiber membranes 31A, only the reformed gas can flow. Moreover, each of the space between the sealing section 35A at the left end part of the hollow fiber membrane module 301A on the left side and the inner wall surface 331A forming the left end part of the hollow 33A, and the space between the sealing section 35A at the right end part of the hollow fiber membrane module 302A on the right side and the inner wall surface 331A forming the right end part of the hollow 33A communicates with the hollow of the hollow fiber membranes 31A, and consequently only the reformed gas can flow.

The offgas humidification section 36A is provided with an offgas supply tube 381A and an offgas ejection tube 382A similarly to the first embodiment, and the water humidification section 37A is provided with a water supply tube 391A and a water ejection tube 392A. Incidentally, the positional relations among the offgas supply tube 381A, the offgas ejection tube 382A, the water supply tube 391A and the water ejection tube 392A are the order of the offgas supply tube 381A, the offgas ejection tube 382A, the water supply tube 391A and the water ejection tube 392A in order from the left similarly to the first embodiment.

Consequently, the water molecules included in the offgas supplied from the offgas supply tube 381A to the offgas humidification section 36A transfer to the inside of the hollow fiber membranes 31A to humidify the reformed gas, and after that the water molecules are ejected from the offgas ejection tube 382A. Moreover, also the water molecules included in the water supplied from the water supply tube 391A to the water humidification section 37A transfer to the inside of the hollow fiber membranes 31A to humidify the reformed gas, and after that the water molecules are ejected from the ejection tube 392A.

Incidentally, the method of manufacturing the hollow fiber membrane modules 301A and 302A is the method similar to that of the first embodiment except for forming the sealing sections 35 formed at both the end portions of the hollow fiber membrane module 301 of the first embodiment, and consequently the description of the method of the present embodiment is omitted. In particular, the length of the hollow fiber membrane module 301A is formed to be longer than that of the hollow fiber membrane module 302A.

Then, both of the manufactured hollow fiber membrane modules 301A and 302A are inserted in the concave portion of the case body 321A with a predetermined space along the longitudinal direction thereof after the application of an adhesive and sealing medium to the sealing sections 35 formed at both of their end portions, and the cover 322A is fastened to the case body 321A with an adhesive, or O-rings or the like and screws. Incidentally, the gaps among the case body 322A, the inner wall surface of the cover 322A and each of the sealing sections 35A are hermetically sealed with the above adhesive and sealing medium, and the space between the humidification device 3A and the outside thereof is hermetically sealed with the above adhesive, or the O-rings or the like.

Next, the operation of the humidification device 3A is described.

The reformed gas supplied from the selective oxidation reactor 23 to the offgas humidification section 36A in the hollow 33A of the case 32A through the reformed gas supply tube 341A is first supplied into the hollow of each of the hollow fiber membranes 31A on the hollow fiber membrane module 301A on the left side in the humidification device 3A. On the other hand, the offgas is supplied from the offgas supply tube 381A to the offgas humidification section 36A, and the water molecules in the offgas is taken in from the outside of the hollow fiber membranes 31A to their inner parts and the hydrogen in the reformed gas in the hollow of the hollow fiber membranes 31A is humidified by the offgas. The humidified hydrogen again flows into the hollow of each of the hollow fiber membranes 31A of the hollow fiber membrane module 302A on the right side through the space formed between the sealing section 35A at the right end part of the hollow fiber membrane module 301A on the left side and the sealing section 35A at the left end part of the hollow fiber membrane module 302A on the right side. Moreover, the offgas supplied from the offgas supply tube 381A is ejected to the offgas ejection tube 382A by the pressure difference in the case 32A.

Furthermore, water is supplied from the water supply tube 391A to the water humidification section 37A, and water molecules is taken in from the outside of the hollow fiber membranes 31A to their inner parts by the water and the water molecules transfers in the hollow fiber membranes 31A of the hollow fiber membrane module 302A on the right side. Thereby, the hydrogen humidified by the offgas is further humidified. Then, the humidified hydrogen is ejected from the right end part of the hollow fiber membrane module 302A on the right side to the outside of the case 32A through the reformed gas ejection tube 342A. After that, the hydrogen is supplied to the fuel cell 4. Moreover, the water supplied from the water supply tube 391A is ejected to the water ejection tube 392A by the pressure difference in the case 32A.

As above, according to the second embodiment of the present invention, in the humidification device 3A, because the two hollow fiber membrane modules 301A and 302A are housed in the hollow 33A along the longitudinal direction thereof and the sealing sections 35A are severally provided at both the end portions of each of the hollow fiber membrane modules 301A and 302A, the spaces enclosed by the sealing sections 35A at both the end portions of each hollow fiber membrane modules 301A and 302A are used as the offgas humidification section 36A and the water humidification section 37A, respectively. Consequently, the offgas supplied to the offgas humidification section 36A and the water supplied to the water humidification section 37A are not mixed with each other. First, the hydrogen in the reformed gas supplied into the hollow fiber membranes 31A is humidified by the offgas in the offgas humidification section 36A, and after that the hydrogen is humidified by the water in the water humidification section 37A. In this manner, the humidification by both of the offgas and the water can be easily realized in the one humidification device 3A, and desired humidity can be obtained (in the range of from several tens percents to one hundred percents). As a result, the hydrogen in the humidified reformed gas can be used as the fuel of the fuel cell 4.

Moreover, only by housing the hollow fiber membrane modules 301A and 302A provided with the sealing sections 35A at both of their end portions into the hollow 33A along the longitudinal direction thereof, the hollow 33A can be easily partitions into the offgas humidification section 36A and the water humidification section 37A with high airtightness, and there is no necessity of providing individual apparatus of a humidification device for offgas and a humidification device for water. Consequently, the humidification apparatus 3A can be easily adapted to the prior art, and the introducing cost thereof and the developing cost thereof can be reduced.

Moreover, by suitably changing the lengths of the hollow fiber membrane modules 301A and 302A themselves, the sizes of the offgas humidification section 36A and the water humidification section 37A can be changed, and consequently the control of humidity becomes easy.

Moreover, because the sealing sections 35 are provided at both the end portions of each of the hollow fiber membrane modules 301A and 302A, the reformed gases supplied from the end portions of the hollow fiber membrane modules 301A and 302A into the hollows in the hollow fiber membranes 31, and the offgas in the offgas humidification section 36A or the water in the water humidification section 37A are not mutually mixed.

Third Embodiment

Figures 5A, 5B:
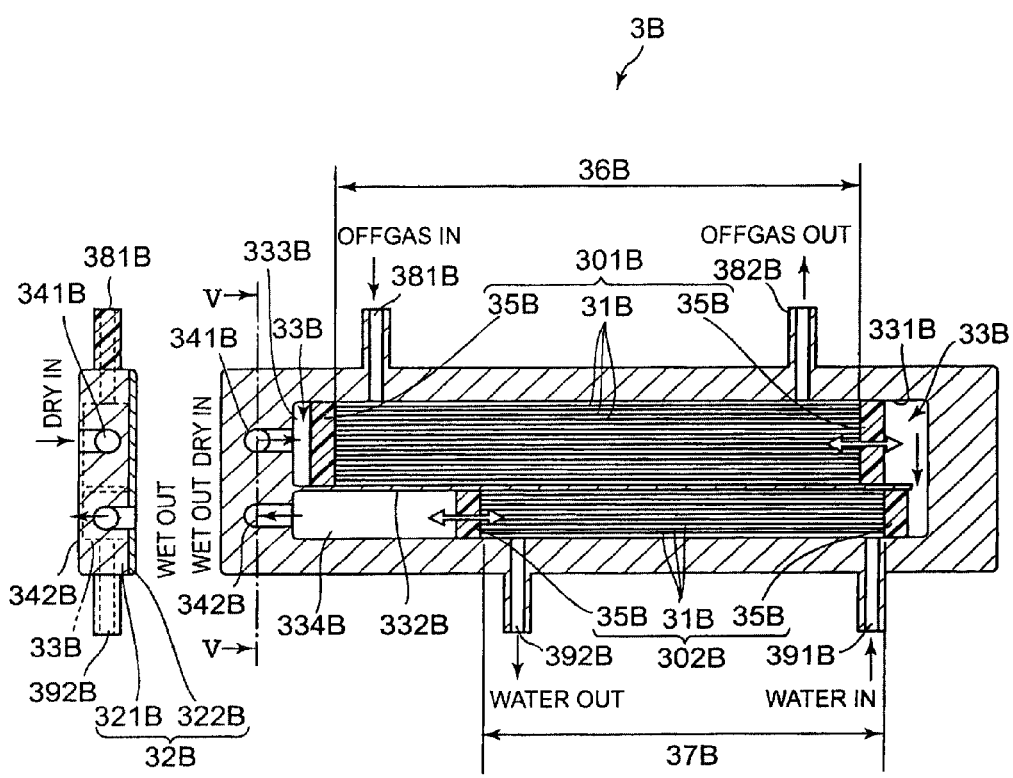
FIG. 5A is a planar sectional view of a humidification device for illustrating a third embodiment of the present invention.
FIG. 5B is a sectional view of the humidification device along a cutting plane line V-V as viewed from the direction of arrows.

FIG. 5A is a planar sectional view of a humidification device 3B, and FIG. 5B is a sectional view as viewed from the direction of arrows at the time of cutting the humidification device 3B along a cutting plane line V-V.

Incidentally, the third embodiment differs from the first embodiment mentioned above in that the shape of a hollow 33B in a case 32B in the humidification device 3B is a letter U when it is seen as a plane, and in that two hollow fiber membrane modules 301B and 302B are housed along the crosswise direction in the hollow 33B like that. The third embodiment has the other reforming apparatus 2 and the fuel cell 4 constituting the power generation apparatus 100 and having the configurations similar to those of the first embodiment. Accordingly the descriptions of the components having the similar configurations are omitted. Incidentally, the components corresponding to those of the above first embodiment are denoted by reference numerals with a letter "B" at the ends of the numerals. In the following, the crosswise direction means the direction forming a right angle to the longitudinal direction.

The humidification device 3B comprises the two hollow fiber membrane modules 301B and 302B and the case 32B housing the hollow fiber membrane modules 301B and 302B therein. The case 32B comprises a case body 321B extending in the longitudinal direction and having a concave portion on the top surface thereof, and a cover 322B covering the case body 321B. The concave portion of the case body 321B is covered by the cover 322B, and thereby the hollow 33B is formed in the inner part of the case body 321B. Moreover, a reformed gas supply tube 341B and a reformed gas ejection tube 342B are connected to the case 32B.

A partition wall (partition) 332B is formed at a part near the front surface from the central part in the crosswise direction in the hollow 33B along the longitudinal direction, and thereby a part of the hollow 33B is partitioned in the crosswise direction, and two hollow portions 333B and 334B are arranged in the crosswise direction to be formed to communicate with each other in the crosswise direction. The hollow 33B formed in this way is shaped to be a letter U when it is seen as a plane.

Incidentally, in the third embodiment, reformed gas is supplied from the reformed gas supply tube 341B connected to the left end part of a first hollow portion 333B facing the back surface side between the two hollow portions 333B and 334B arranged in the crosswise direction, and humidified hydrogen is ejected from the reformed gas ejection tube 342B connected to the left end part of the second hollow portion 334B facing the front surface side.

Moreover, the hollow fiber membrane modules 301B and 302B are housed in the first hollow portion 333B and the second hollow portion 334B, respectively. Incidentally, the first hollow portion 333B has a width (the length in the crosswise direction) wider than that of the second hollow portion 334B, and consequently the width of the hollow fiber membrane module 301B housed in the first hollow portion 333B is formed to be wider than that of the hollow fiber membrane module 302B housed in the second hollow portion 334B.

Moreover, sealing sections 35B are provided at both the end portions of each of the hollow fiber membrane modules 301B and 302B. Consequently, the hollow enclosed by the sealing sections 35B provided at both the end portions of the hollow fiber membrane module 301B in the first hollow portion 333B, the inner wall surface 331B of the first hollow portion 333B, and the partition 332B is used as an offgas humidification section 36B (one humidity adjusting section), and the hollow enclosed by the sealing sections 35B provided at both the end portions of the hollow fiber membrane module 302B in the second hollow portion 334B, the inner wall surface 331B in the second hollow portion 334B, and the partition 332B is used as the water humidification section 37 (one of the other humidity adjusting section). Consequently, the offgas humidification section 36B is formed to have a width wider than that of the water humidification section 37B, and the region in which the humidification is performed by the offgas is formed to be larger than the region in which the humidification is performed by the water.

Furthermore, because the space between the sealing section 35B at the right end part of the hollow fiber membrane module 301B in the first hollow portion 333B and the sealing section 35B at the right end part of the hollow fiber membrane module 302B in the second hollow portion 334B communicates with the hollow of the hollow fiber membranes 31B, only the reformed gas can flow. Moreover, each of the space between the sealing section 35B at the left end part of the hollow fiber membrane module 301B in the first hollow portion 333B and the inner wall surface 331B forming the left end part of the first hollow portion 333B, and the space between the sealing section 35B at the left end part of the hollow fiber membrane module 302B in the second hollow portion 334B and the inner wall surface 331B forming the left end part of the second hollow portion 334B communicates with the hollow of the hollow fiber membranes 31B, and consequently only the reformed gas can flow.

The offgas humidification section 36B is provided with an offgas supply tube 381B and an offgas ejection tube 382B similarly to the first embodiment, and the water humidification section 37B is provided with a water supply tube 391B and a water ejection tube 392B. Incidentally, the positional relations among the offgas supply tube 381B, the offgas ejection tube 382B, the water supply tube 391B and the water ejection tube 392B are different from those of the first embodiment. That is, the offgas supply tube 381B and the offgas ejection tube 382B are provided on the back surface of the case body 321B, and the water supply tube 391B and the water ejection tube 392B are provided on the front surface of the case body 321B. Then, the positional relations are the order, from the left in the longitudinal direction of the case body 321B, of the offgas supply tube 381B, the water ejection tube 392B, the offgas ejection tube 382B and the water supply tube 391B.

Consequently, the water molecules included in the offgas supplied from the offgas supply tube 381B to the offgas humidification section 36B transfer to the inside of the hollow fiber membranes 31B to humidify the reformed gas, and after that the water molecules are ejected from the offgas ejection tube 382B. Moreover, also the water molecules included in the water supplied from the water supply tube 391B to the water humidification section 37B transfer to the inside of the hollow fiber membranes 31B to humidify the reformed gas, and after that the water molecules are ejected from the ejection tube 392B.

Incidentally, the method of manufacturing the hollow fiber membrane modules 301B and 302B is the method similar to that of the first embodiment except for forming the sealing sections 35 formed at both the end portions of the hollow fiber membrane module 301 of the first embodiment, and consequently the description of the method of the present embodiment is omitted. In particular, the hollow fiber membrane module 301B housed in the first hollow portion 333B is formed to have a width wider than that of the hollow fiber membrane module 302B housed in the second hollow portion 334B using more hollow fiber membranes 31B than those to be used for the hollow fiber membrane module 302B.

Then, both of the manufactured hollow fiber membrane modules 301B and 302B are inserted in the first hollow portion 333B of the case body 321B and the second hollow portion 334B thereof, respectively, after the application of an adhesive and sealing medium to the sealing sections 35 formed at both of their end portions, and the cover 322B is fastened to the case body 321B with an adhesive, or O-rings or the like and screws. Incidentally, the gaps between the inner wall surface of the case body 321B and the cover 322B, and each of the sealing sections 35b are hermetically sealed with the above adhesive and sealing medium, and the space between the humidification device 3B and the outside thereof is hermetically sealed with the above adhesive, or the O-rings or the like.

Next, the operation of the humidification device 3B is described.

The reformed gas supplied from the selective oxidation reactor 23 to the offgas humidification section 36B in the hollow 33B of the case 32B through the reformed gas supply tube 341B is first supplied into the hollow of each of the hollow fiber membranes 31B of the hollow fiber membrane module 301B in the first hollow portion 333B in the humidification device 3B. On the other hand, the offgas is supplied from the offgas supply tube 381B to the offgas humidification section 36B, and the water molecules in the offgas is taken in from the outside of the hollow fiber membranes 31B to their inner parts and the hydrogen in the reformed gas in the hollows of the hollow fiber membranes 31B is humidified by the offgas. The humidified hydrogen again flows into the hollow of each of the hollow fiber membranes 31B of the hollow fiber membrane module 302B through the space formed between the sealing section 35B at the right end part of the hollow fiber membrane module 301B and the sealing section 35B at the right end part of the hollow fiber membrane module 302B. Moreover, the offgas supplied from the offgas supply tube 381B is ejected to the offgas ejection tube 382B by the pressure difference in the case 32B.

Furthermore, water is supplied from the water supply tube 391B to the water humidification section 37B, and water molecules is taken in from the outside of the hollow fiber membranes 31B to their inner parts by the water and the water molecules transfers in the hollow fiber membranes 31B of the hollow fiber membrane module 302B. Then, the hydrogen humidified by the offgas is further humidified. The humidified hydrogen is ejected from the left end part of the hollow fiber membrane module 302B to the outside of the case 32A through the reformed gas ejection tube 342B. After that, the hydrogen is supplied to the fuel cell 4. Moreover, the water supplied from the water supply tube 391B is ejected to the water ejection tube 392B by the pressure difference in the case 32B.

As above, according to the third embodiment of the present invention, a part of the hollow 33B of the case 32B is partitioned in the width direction in the humidification device 3B; thereby the first hollow portion 333B and the second hollow portion 334B are formed to be arranged in the width direction and to communicate with each other in the width direction; the hollow fiber membrane modules 301B and 302B are housed in the hollow portions 333B and 334B, respectively; and the sealing sections 35B are severally provided at both the end portions of each of the hollow fiber membrane modules 301B and 302B. Consequently, the spaces enclosed by the sealing sections 35B at both the end portions of each of the hollow fiber membrane modules 301B and 302B are used as the offgas humidification section 36B and the water humidification section 37B, respectively. Consequently, the offgas supplied to the offgas humidification section 36B and the water supplied to the water humidification section 37B are not mixed with each other. First, the hydrogen in the reformed gas supplied into the hollow fiber membranes 31B is humidified by the offgas in the offgas humidification section 36B, and after that the hydrogen is humidified by the water in the water humidification section 37B. In this manner, the humidification by both of the offgas and the water can be easily realized in the one humidification device 3B, and desired humidity can be obtained (in the range of from several tens percents to one hundred percents). As a result, the hydrogen in the humidified reformed gas can be used as the fuel of the fuel cell 4.

Moreover, only by housing the hollow fiber membrane modules 301B and 302B provided with the sealing sections 35B at both of their end portions into the first hollow portion 333B and the second hollow portion 334B, respectively, which are provided to be arranged in the width direction, the hollow 33B can be easily partitions into the offgas humidification section 36B and the water humidification section 37B with high airtightness, and there is no necessity of providing individual apparatus of a humidification device for offgas and a humidification device for water. Consequently, the humidification apparatus 3B can be easily adapted to the prior art, and the introducing cost thereof and the developing cost thereof can be reduced.

Moreover, by suitably changing the lengths of the hollow fiber membrane modules 301B and 302B themselves, the sizes of the offgas humidification section 36B and the water humidification section 37B can be changed, and consequently the control of humidity becomes easy.

Moreover, because the sealing sections 35 are provided at both the end portions of each of the hollow fiber membrane modules 301B and 302b, the reformed gases supplied from the end portions of the hollow fiber membrane modules 301B and 302B into the hollows in the hollow fiber membranes 31B, and the offgas in the offgas humidification section 36B or the water in the water humidification section 37B are not mutually mixed.

Furthermore, the hollow fiber membrane modules 301B and 302B are housed in the first hollow portion 333B and the second hollow portion 334B, which are arranged in the width direction, respectively, and the lengths of the hollow fiber membrane modules 301B and 302B can be made to be longer than those of the hollow fiber membrane modules 301, 301A and 302A of the first and the second embodiments. Consequently, the fine adjustment of humidity becomes easy.

Incidentally, the present invention is not limited to the above embodiments, but can be suitably changed within the range of not departing the spirit thereof.

For example, although it is not shown, in the third embodiment, the hollow fiber membrane modules 301B and 302B are made to be housed in the first hollow portion 333B and the second hollow portion 334B, respectively, but one hollow fiber membrane module may be housed so as to span the first hollow portion 333B and the second hollow portion 334B and a sealing sections is provided at almost the central part in the longitudinal direction as in the hollow fiber membrane module 301 of the first embodiment to partition the offgas humidification section and the water humidification section.

Figures 6A, 6B:
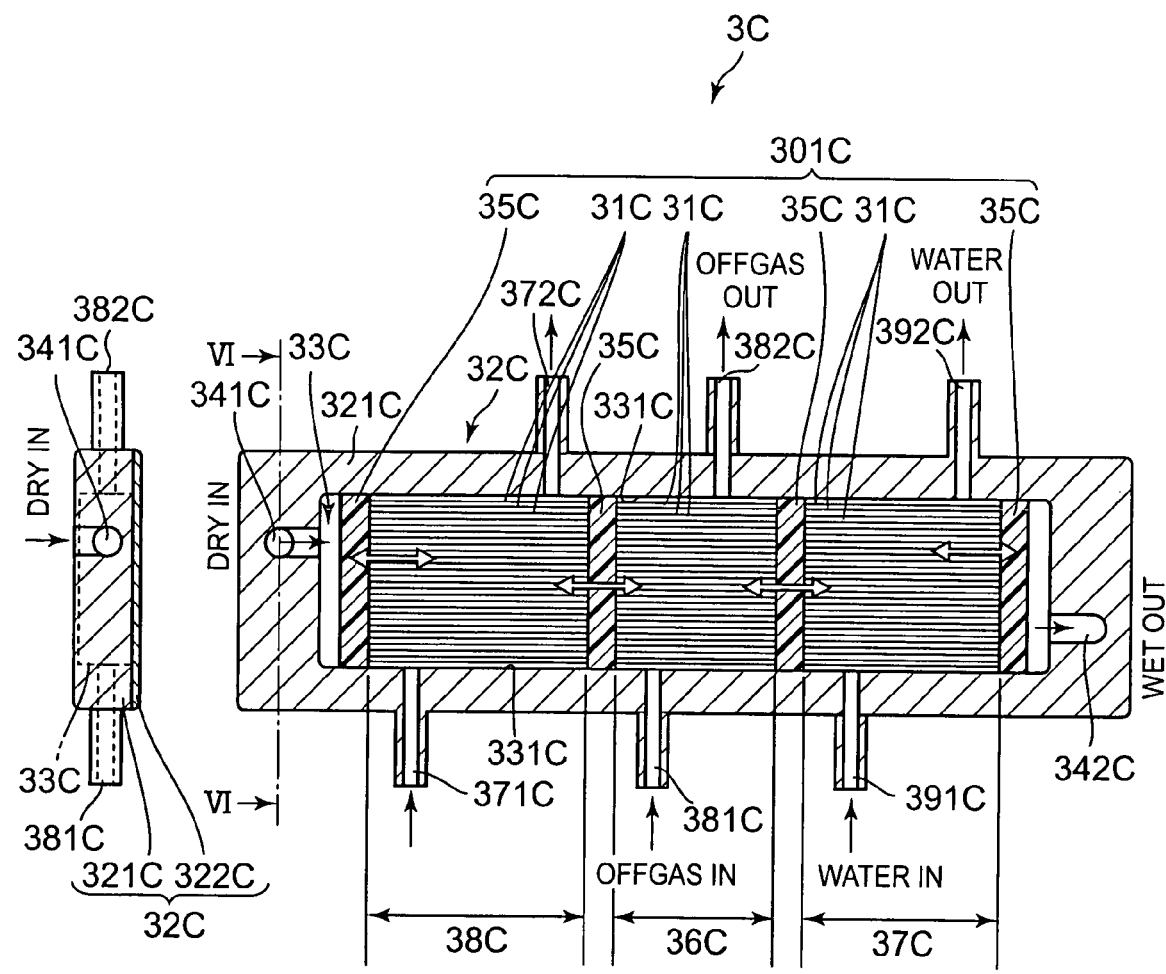
FIG. 6A is a planar sectional view of a humidification device for illustrating a modification of the present invention.
FIG. 6B is a sectional view of the humidification device along a cutting plane line VI-VI as viewed from the direction of arrows.

Moreover, as shown in FIGS. 6A and 6B, by providing two or more sealing sections 35 at almost the central part in the first embodiment, three or more humidity adjusting sections may be provided. By providing three or more hollow fiber membrane modules in the second embodiment, three or more humidity adjusting sections may be provided. In these cases, by using three or more kinds of fluids as the need arises, the humidity of a humidity-adjusted fluid such as a reformed gas can be adjusted to be desired humidity, and such a modified embodiment can be adapted to the prior art. Consequently, the introducing cost thereof and the developing cost thereof can be reduced. Incidentally, the gas including the unreacted hydrogen that is not used in the reaction of the above electrochemical reaction formula (4) at the fuel electrode in the fuel cell 4 may be used as a third humidity adjustment fluid.

Moreover, although the partition wall 332B is provided in the hollow 33B to partition the hollow 33B so as to form the two hollow portions 333B and 334B in the width direction in the third embodiment, a further partition wall may be provided to form three or more hollow portions (not shown). In this case, the lengths of the offgas humidification section 36B and the water humidification section 37B can be made to be further longer, and the improvement of the humidify performance thereof can be attained.

Moreover, although the first to the third embodiments adopt the configuration of performing the humidification by the offgas first, and performing the humidification by water after that, the reverse configuration of performing the humidification by water first and performing humidification by offgas after that may be adopted.

Moreover, although the humidification devices 3, 3A and 3B in the above first to the third embodiments are connected to the reforming apparatus 2 to humidify the reformed gas including hydrogen produced by the reforming apparatus 2, they may humidify the air including the oxygen to be supplied to the fuel cell 4.

Furthermore, although the gas including the water vapor, unreacted oxygen and the like that have been produced by the air electrode of the fuel cell 4 (in accordance with the above electrochemical reaction formula (5)) is used as the offgas to be supplied to the gas humidification device 3, the gas is not limited to the above ones, but the gas including the unreacted hydrogen that is not used in the reaction of the above electrochemical reaction formula (4) at the fuel electrode in the fuel cell 4 may be used.

Moreover, although any of the first to the third embodiments allows the reformed gas to flow as the humidity-adjusted fluid to be humidified into the insides of the hollow fiber membranes, the offgas may flow as the humidity-adjusted fluid to be dehumidified (dried) in the inside of the hollow fiber membranes. In this case, for example, the reformed gas is made to flow in the region made to be the offgas humidification section 36 (the one humidity adjusting section), and the air is made to flow in the region made to be the water humidification section 37 (one of the other humidity adjusting section) in the first embodiment. Thereby, in each of the humidity adjusting sections, water molecules transfers from the inside of the hollow fiber membranes 31 to the outside, and the offgas is dehumidified. Consequently, the humidity is adjusted.

All of the disclosures including the patent specification, the claims, the attached drawings and the abstract of Japanese Patent Application No. 2006-116821 filed Apr. 20, 2006 are herein incorporated by reference.

Although various typical embodiments have been shown and described, the present invention is not limited to those embodiments. Consequently, the scope of the present invention can be limited only by the following claims.

What is claimed is:

1. A humidity adjustment apparatus comprising:
    a plurality of hollow fiber membranes in each of which a fluid having a partial water vapor pressure and a fluid having a different partial water vapor pressure respectively flow in an inside space and an outside space, to transfer water molecules between the fluids, and to thereby humidify the fluid having a lower partial water vapor pressure among the fluids;
    a hollow fiber membrane module including the plurality of hollow fiber membranes;
    a housing provided with a hollow therein to house the hollow fiber membrane module; and
    a sealing section to divide the outside space of each of the hollow fiber membranes in the hollow of the housing into a plurality of outside space portions;

wherein:
the housing is provided with a partition of which at least one end portion is separated from an inner wall of the housing;
a plurality of hollow portions are formed in the housing by parting the hollow with the partition;
a first hollow portion of the hollow portions communicates with at least a second hollow portion of the hollow portions;
the hollow fiber membrane module is housed in each of the hollow portions; and
the sealing section is provided at each of both end portions of the hollow fiber membrane module in each of the hollow portions.

2. The humidity adjustment apparatus according to claim 1, wherein:
the fluid flowing in the inside space of each of the hollow fiber membranes is a humidity-adjusted fluid to be humidified;
the fluid flowing in the outside space of each of the hollow fiber membranes is a humidity adjustment fluid to humidify the humidity-adjusted fluid;
the first hollow portion of the hollow portions acts as a first humidity adjusting section to adjust a humidity of the humidity-adjusted fluid, and in the first humidity adjusting section a first fluid of the humidity adjustment fluid having a partial water vapor pressure higher than a partial water vapor pressure of the humidity-adjusted fluid is supplied to the outside space of each of the hollow fiber membranes; and
the second hollow portion of the hollow portions acts as a second humidity adjusting section to adjust the humidity of the humidity-adjusted fluid, and in the second humidity adjusting section a second fluid of the humidity adjustment fluid having a partial water vapor pressure higher than the partial water vapor pressure of the humidity-adjusted fluid is supplied to the outside space of each of the hollow fiber membranes.

3. The humidity adjustment apparatus according to claim 2, wherein a region in which the humidity is adjusted at the first humidity adjusting section is larger than a region in which the humidity is adjusted at the second humidity adjusting section.

4. A power generation apparatus comprising:
the humidity adjustment apparatus according to claim 1;
a reforming apparatus to reform a fuel to produce a reformed gas, and to supply the produced reformed gas to the humidity adjustment apparatus; and
a fuel cell to generate electricity using the reformed gas which is humidified by the humidity adjustment apparatus.

5. A power generation apparatus comprising:
the humidity adjustment apparatus according to claim 2;
a reforming apparatus to reform a fuel to produce a reformed gas, and to supply the produced reformed gas as the humidity-adjusted fluid to the humidity adjustment apparatus; and
a fuel cell to generate electricity using the reformed gas which is humidified by the humidity adjustment apparatus;
wherein the first fluid of the humidity adjustment fluid comprises an offgas ejected from the fuel cell; and
wherein the second fluid of the humidity adjustment fluid comprises water.

* * * * *